United States Patent [19]

Patel

[11] Patent Number: 5,023,826

[45] Date of Patent: Jun. 11, 1991

[54] APPARATUS FOR SKIPPING ARITHMETIC CALCULATIONS INVOLVING LEADING ZEROS

[75] Inventor: Shirish Patel, Waltham, Mass.

[73] Assignee: Bull HN Information Systems Inc., Billerica, Mass.

[21] Appl. No.: 464,504

[22] Filed: Jan. 11, 1990

[51] Int. Cl.[5] ............................................... G06F 7/00
[52] U.S. Cl. .................................................. 364/736
[58] Field of Search ................ 364/736, 715.06, 715.1; 340/146.2

[56] References Cited

U.S. PATENT DOCUMENTS 4,539,549 9/1985 Hong et al. ...................... 340/146.2
4,774,688 9/1988 Kobayashi et al. ......... 364/715.06 X
4,789,956 12/1988 Hildebrandt ............... 364/715.04 X

OTHER PUBLICATIONS

Shirley, "Parallel-Search MAX/MIN Word Algorithm"; IBM Tech. Disclosure Bull., vol. 22, No. 7; Dec. 1979, pp. 2671-2672.

Primary Examiner—Gary V. Harkcom
Assistant Examiner—Tan V. Mai
Attorney, Agent, or Firm—Gerald J. Cechony; John S. Solakian

[57] ABSTRACT

In a digital computer system which may perform arithmetic computations on multi-word variable-length operands, and in which computation is performed right to left (least significant digit first), apparatus detects when all word positions containing significant digits have been computed and terminates computation after computing one additional word position to allow any carry to propagate. Additional apparatus forces zeros for those word positions of an operand that do not contain significant digits, for they may be non-existent positions.

6 Claims, 5 Drawing Sheets

APPARATUS FOR SKIPPING ARITHMETIC CALCULATIONS INVOLVING LEADING ZEROS

FIELD OF THE INVENTION

This invention relates to digital computer systems, particularly to those portions thereof that perform arithmetic computations, and most particularly to means for speeding up arithmetic calculation in such portions.

BACKGROUND OF THE INVENTION

A digital computer system typically includes a memory for storing instructions (collectively said to constitute a "program") and operands (collectively constituting "data") to be operated upon by the instructions. It typically also includes means for fetching the instructions from memory, decoding them, fetching from memory the operands called for by the instructions, performing upon the operands the operations called for by the instructions, and storing the modified operands back in memory.

Some of the operations called for by the instructions may be arithmetic operations, requiring two operands to be added or multiplied, one to be subtracted from the other, or one to be divided into the other.

A memory unit typically has a certain number of bits that it can store and retrieve in a single operation, commonly known as the "word size" of the memory. The data paths ("buses" and registers) within the computer system typically are provided to handle the same word size. Typical word sizes are sixteen or thirty-two bits.

For most efficient operation of a computer system, operand size should be limited to the word size; however, such an approach might not suit the needs of the user. Therefore, many computer systems have provision for performing computations on operands that must be stored and passed around the system in several words.

The machine of the present invention performs numerical calculations on operands up to 63 digits in length. Most often, numbers do not actually contain nearly so many digits, and might thus have a large number of leading zeros. In the prior art, calculations would be performed on all digits of the operands, although the calculations in such operations as add and subtract have no effect on those digit positions where both operands contain leading zeros. Thus, computation time may be wasted.

It is thus a general object of the present invention to provide improved digital computer systems.

It is a particular object of the present invention to increase the efficiency of the arithmetic elements of computer systems.

It is a more particular object of the present invention to provide arithmetic elements of computer system with the capability to skip calculation on portions of operands containing leading zeros.

SUMMARY OF THE INVENTION

The present invention checks words of operands being presented for arithmetic calculation, and makes note of which operand words contain non-zero bits. It then calculates, for a pair of operands to be operated upon, the most significant word position for which either operand contains non-zeros and employs the result of that calculation to terminate calculation when all non-zero digit positions have been calculated, thus avoiding fruitless computation and its resultant waste of time.

Other advantages of the invention will be apparent to those skilled in the art after consulting the ensuing description and the accompanying drawings, wherein:

DETAILED DESCRIPTION OF THE PREFERRED EMBODIMENT

Figure 1:
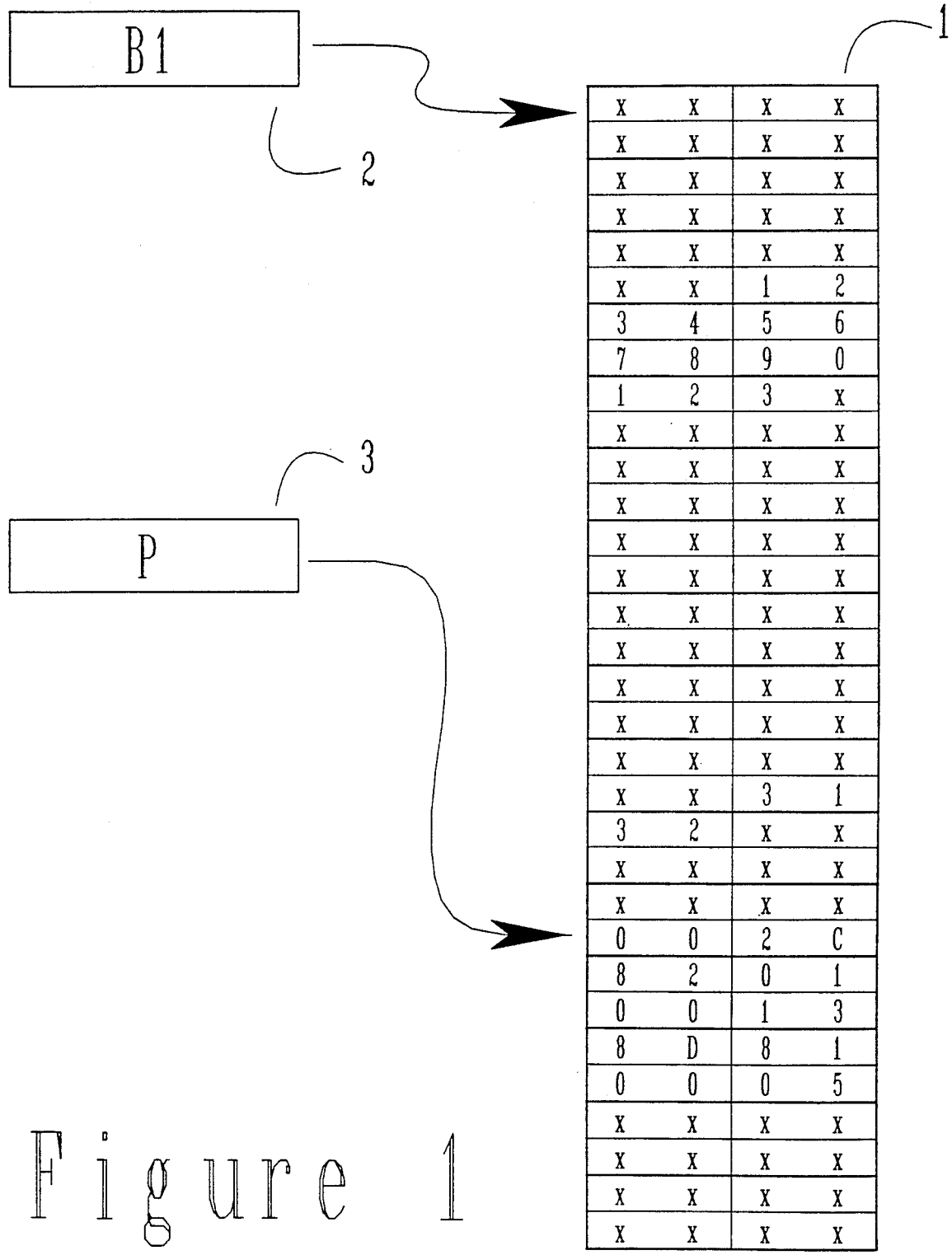
FIG. 1 shows a portion of system memory containing an assumed instruction and its operands.

The invention is embodied in the Commercial Instruction Processor (CIP) of a BULL HN Information Systems DPS-6+ medium-scale computer system.

The system comprises several subsystems, including a Memory Unit for storing instructions and data, the I-Unit (Instruction Unit) for retrieving instructions from memory and decoding them, the A-Unit (Address Unit) for calculating memory addresses from formulas that may be provided in the instructions and retrieving data from those addresses, and an E-Unit (Execution Unit) for executing the instructions.

The CIP (sometimes known as the C-Unit) is a system component for executing commercial instructions, which may be regarded as a subset of the DPS-6+ instruction set. The commercial instructions are categorized as numeric instructions (for performing numerical calculations), alphabetic instructions (for performing string moves, string compares, and the like), edit instructions (for reformatting operands) and branch instructions. The present invention may be understood in the context of numeric instrucions; therefore, the alphabetic instructions, the edit instructions, and the branch instructions will not be described herein.

A commercial numeric instruction comprises a one-word (16-bit) Operation Code (Op Code) immediately followed by words identifying one or more Data Descriptors (DD's). Each instruction in the repertoire implicitly operates on a specific number of operands (always 1, 2, or 3); there must be a DD for each of the operands specifying such things as its memory address, its length, and its data type.

There are six data types that may be operated upon by the commercial numeric instructions. The six types fall into two broader categories: packed and unpacked.

Packed data comprises BCD digits; it thus requires 4 bits (or a half byte) to store one digit; four digits can be stored in one 16-bit word.

Unpacked data (also known as "zoned" data or "string" data) is typically in ASCII code; it thus requires a byte (8 bits) to store a digit, with the rightmost (less significant) half-byte containing the digit in BCD and the leftmost (more significant) half-byte containing "zone" data—a hexadecimal 3 for ASCII code. Two digits can be stored in one 16-bit word.

The data fall into the six types according to whether packed or unpacked, and further according to the form of the sign:

| DATA TYPE | DESCRIPTION |
|---|---|
| ZU | Zoned, unsigned (assumed positive) |
| ZL | Zoned, leading sign |
| ZT | Zoned, trailing sign |
| TP | Zoned, trailing overpunched sign |
| PU | Packed, unsigned (assumed positive) |
| PT | Packed, trailing sign |

"Leading sign" indicates that the first element of the operand (i.e., the first half-byte for packed data or the first byte for zoned data) contains the sign and not a data digit. "Trailing sign" indicates that the last element contains the sign and not a data digit.

"Trailing overpunched sign" (also known as "trailing punch") indicates that the final character of a zoned operand is coded to denote both the numerical digit and the sign; this represents a deviation from standard ASCII or EBCDIC code. The nature of the coding need not be understood to comprehend the present invention; it need be interpreted only at the time of doing the actual numerical calculation.

Therefore, the number of digits in a ZU, PU, or TP operand is equal to the specified length of the operand, whereas the number of digits in a ZL, ZT, or PT operand is one less than the specified length of the operand, since one digit position is that may be specified for a commercial numeric operand is $63_{10}$ The length must be specified to indicate that there is at least one digit. That is, the length must equal at least two for ZL, ZT, or PT operands, and at least one for ZU, PU, or TP operands.

The commercial numeric instructions that are facilitated by the present invention are:

| NAME | MNE-MONIC | OP CODE | FUNCTION |
|---|---|---|---|
| Decimal Add | DAD | 002C | (DD2) + (DD1) → (DD2) |
| Decimal Subtract | DSB | 002D | (DD2) − (DD1) → (DD2) |

As mentioned above, each instruction comprises a one-word Op Code followed by information specifying as many DD's (Data Descriptors) as the instruction has operands (i.e., two for DAD, DSB, or DML, three for DDV). The Op Code is followed by DDI and DD2, and then by DD3 if it is a DDV instruction. The legend "(DDn)" means "the operand specified by the n'th DD".

DD's may accompany the instruction (in which case they are known as Immediate DD's or ID's) or they may be stored elsewhere in memory (in which case they are known as Remote DD's or RD's). The first word of each DD specifier accompanying the instruction (i.e., the word following the Op Code, the word following the first DD specifier, and the word following the second DD specifier for a DDV instruction) may in fact be the first word of a DD, or it gives information specifying where to find the first word of the DD. The basis of this determination will be preliminarily explained now, and will be clearer after expostulating the AS (Address Syllable) field of a DD, further below:

If the four low-order bits of the DD specifier are all zeros, this indicates that the DD is a Remote DD—the twelve high-order bits of the DD specifier (collectively known as a "label") are multiplied by two and added to the contents of a register called the Remote Descriptor Base Register (RDBR) to produce the address of the Remote DD. (The RDBR would, of course, have been preloaded by the program which provided the current commercial numeric instruction.)

If the seven low-order bits of the DD specifier contain $58_{16}$, this indicates that the current DD will use Address Map 3, 4, or 5, as opposed to Address Map 2 which is the default Address Map as will be explained further below. In this case, the next sequential word in memory is the first word of the DD.

If neither of the above two conditions is met, the first word of the DD specifier is the first word of the DD. NOTE: In the ensuing discussion, the following conventions will be employed: The letter "H" denotes hexadecimal. E.g., "32H" denotes hexadecimal 32. The letter "B" denotes binary. E.g., "00000100B" denotes a binary number having a value equal to decimal 4. A number without an "H" or "B" appended shall be presumed to be decimal. When specifying bit locations within a binary word, bit 0 is the leftmost ⓒr least significant bit, and bit 15 is the rightmost or most significant bit. A colon denotes bit concatenation. For example, REG1:00 would mean that two zero bits are concatenated to the right of the contents of REG1.

The first word of a DD for commercial numeric operands contains a first-digit-offset field, a sign control field, a length field, a packed/unpacked field, and an address syllable field. Certain of the field lengths are different depending upon whether the operand is packed or unpacked, as specified by the packed/unpacked field, which is bit 8 (bit 8=0 for unpacked, 1 for packed).

The first DD word for packed data is laid out thusly:

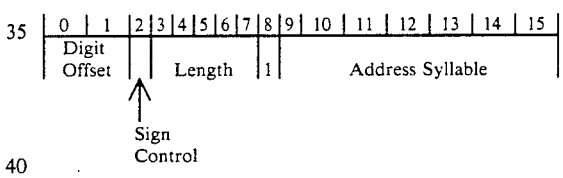

Digit Offset: (Bits 0-1) Specifies the offset within the addressed word of the start (MSD) of the operand. Since four packed digits may occupy a word, the current operand may commence in half-byte, 0, 1, 2, or 3 of a word, according to the contents of this field.

Sign Control: (Bit 2) 0 for unsigned (type PU); 1 for trailing sign (type PT).

Length: (Bits 3-7) If equal to 1 through 31, the actual length of the operand; if equal to 0, indicates that the length of the operand is to be found in register Rn(10-15), where n=4 for DD1, n=5 for DD2, and n=6 for DD3. (Note that the latter method is the only way to specify a length greater than 31.)

Bit 8: A 1 indicates that the operand is a packed operand.

Address Syllable: (Bits 9-15) Used to select an entry from the Address Map, which will be described in detail below.

The first DD word for zoned data is laid out thusly:

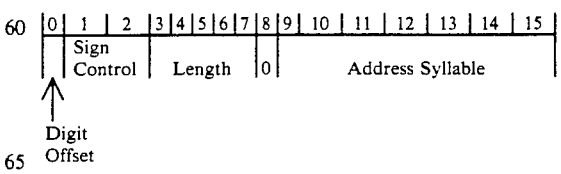

Digit Offset: (Bit 0) Specifies the offset within the addressed word of the start (MSD) of the operand. Since two unpacked (ASCII) digits may occupy a word, the current -continued operand may commence in byte 0 or 1 of a word, according to the value of this bit.

Sign Control: (Bits 1-2) 00 = unsigned (type ZU); 01 = trailing overpunched sign (type TP); 10= leading sign (type ZL); 11 = trailing sign (type ZT).

Length: (Bits 3-7) Same as for packed data, i.e., if equal to 1 through 31, the actual length of the operand; if equal to 0, indicates that the length of the operand is to be found in register Rn(10-15), where n=4 for DD1, n=5 for DD2, and n=6 for DD3. (Note that the latter method is the only way to specify a length greater than 31.)

Bit 8: A 0 indicates that the operand is a zoned (string or unpacked) operand.

Address Syllable: (Bits 9-15) Used to select an entry from the Address Map, which will be described in detail below.

A DD may contain additional words after the first, as a function of the entry obtained from the Address Map.

As mentioned above, the address syllable (AS) of a DD is used to select an entry from the Address Map. Several Address Maps are available on the system; the default Address Map for commercial instructions is Address Map 2; however, a DD specifier may stipulate that Address Maps 3, 4, or 5 will be used for a particular operand.

An Address Map is organized as a table of 8 rows by 16 columns; table entries are accessed according to the Address Syllable (AS) field of a DD. The high-order three bits of the AS (bits 9-11 of the DD), denoted the "m" field, specify the row, while the low-order four bits (bits 12-15 of the DD), denoted the "n" field, specify the column.

The makeup of Address Map 2 is given in Table 1:

TABLE 1

|   | n |  |  |  |
| --- | --- | --- | --- | --- |
| m | 0 | 1-7 | 8 | 9-F |
| 0 | Use Remote | Bn + D + O |  | @[B(n − 8) + D] + O |
| 1 | Descriptor | Bn + D + Rm + O | P + D + Rm + O | @[B(n − 8) + D] + Rm + O |
| 2 |  |  |  |  |
| 3 |  |  |  |  |
| 4 |  |  | @[P + D] + O |  |
| 5 |  |  | AS345 |  |
| 6 |  |  | P + BD + O |  |
| 7 |  |  | IMO |  |

The following notational conventions are employed:
Bx denotes Base Register x. Several base registers are provided on the system for performing base-displacement addressing.
D denotes a displacement to be added to the contents of a selected base register to produce an address. The displacement, when one is specified by the AS, is in the second word of the DD.
O denotes the offset, obtained from the offset field of the first word of the DD.
P denotes the Program Counter. (As is well known to those in the art, the Program Counter is used to access the current instruction; it may be used in address calculations to determine the addresses of operands that have been stored at some relation to the location of the instruction.)
Rx denotes the x'th one of several general-purpose registers provided on the system.
BD denotes "binary displacement", a 32-bit signed binary number found in the second and third words of a DD whose first word calls for this function.
IMO denotes "immediate operand", which will be found in the words following the DD calling for an immediate operand, the number of words being indicated by the operand length and offset specifications.

It is evident, then, that a DD may consists of a number of words, the number being determined by the entry retrieved from the Address Map as specified by the AS of the first word of the DD.

It is seen from Table 1 that if the n field of an AS is equal to $0000_2$, a Remote Descriptor is to be used. As was mentioned, if the first word of a DD specifier meets this criterion, a label found in that word will be used to compute the address of the remote DD.

It is seen that for m=5 and n=8, "AS345" is selected from Address Map 2. As was mentioned, if the first word of a DD specifier meets this criterion, other bits in that word specify one of Address Maps 3, 4, or 5, and the next word in memory is the first word of a DD using the specified one of those maps. Address Maps 3, 4, and 5 will not be discussed here; they provide other addressing possibilities not necessary to an understanding of the present invention.

The preceding discussion indicates that the commercial instructions structions may operate upon operands up to 63 positions in length, where the 63 positions may all contain data digits (for unsigned or trailing overpunched sign data) or where 62 of the positions may contain data digits (for signed data). The address determined from the Address Map retrievals and indicated calculations will be the address of the first position of the operand, commonly called the "MSD" (most significant digit), although this term is a misnomer for operands with leading sign; in that case, the address is pointing to the sign, and the next position contains the actual most significant digit. The calculations performed in the execution of the instruction, however, must begin with the LSD (least significant digit).

Data types can be mixed within an instruction; each of the DD's associated with an instruction may specify any of the data types with no regard for consistency of type with the other DD's of that instruction. Data type of the result is determined by the DD of the operand specified to receive the result.

The memory employed in the present embodiment, though having a 16-bit word size, is organized to retrieve data in "double words", or 32-bit units aligned on even-numbered word addresses.

Decimal operands, as discussed above, particularly in connection with the offset field of the DD, are constrained only to beginning on byte boundaries (for zoned data) or half-byte boundaries (for packed data). Thus, they are not constrained to beginning or ending on word or double-word boundaries.

The Commercial Instruction Processor of the present embodiment includes a scratch pad memory for the storage of its operands. According to the present invention, when operands (which may be up to eight double words long) are being fetched from memory and stored in the scratch pad, a check is made of each double word as to whether it contains any non-zero bits; when calculation is being performed, computation can be skipped for double words containing only leading zeros.

The computer system in which the present invention is embodied employs a cache memory in conjunction with the main memory; operands are requested from cache memory and result operands are stored in cache memory. As is well known to those in the computer arts, the cache memory obtains the requested operands from the main memory if they are not already encached, and stores results into the main memory. Understanding of the cache memory is not essential to understanding the present invention. For purposes of the present discussion, correct operation of cache memory is presupposed.

Operation of the invention will be presented in the contexts of an example. With reference to FIG. 1, portions of memory 1 are shown and assumed to contain a DAD (Decimal Add) instruction and its two operands. Locations whose contents are denoted as "x" in FIG. 1 are assumed to contain unspecified information; such information must not be altered by the operation of the DAD instruction.

The basic block depicted in the memory map of FIG. 1 is a 4-bit half-byte; half-bytes are demarked from each other by vertical dotted lines. Bytes within a word are demarked by vertical a light lines. Words within a double word are demarked by horizontal light lines; double words are demarked from each other by heavy horizontal lines. The data depicted in memory 1 is hexadecimal numbers.

B1 register 2 is one of the aforementioned base address registers, and is assumed to be pointing to the first location of the depicted portion of memory. (A register containing the address of a location is commonly said to be "pointing to" that location.)

P register 3 is the program counter of the system, and is assumed to be pointing to the location containing the DAD Op Code of 002CH. Thus, that instruction is now to be executed.

The word following the Op Code is seen to be 8201H. Since it does not meet the aforementioned criteria to select a Remote Descriptor or to select Address Map 3, 4, or 5, it must be the first word of DD1.

8201H has bit 8 equal to 0, indicating that it is a DD specifying a zoned operand. Analyzing the bits of 8201H as discussed above in connection with DD analysis, it is seen that:

Bit 0=1, indicating that the first operand starts in the second byte of the addressed word.

Bits 1-2 =00, indicating that the first operand is unsigned (type ZU)

Bits 3-7=0010, which equals a decimal 2; this indicates that the operand is two digits long.

Bits 9-15=0000001. This is the Address Syllable, and is seen to have an m field of 0 and an n field of 1. Consultation of Address Map 2 indicates that this denotes that the address of the first operand may be determined by adding base address register B1, the Displacement, and the offset. (The offset, specified by bit 0, has been seen to indicate that the operand commences in the second byte.)

The Displacement, as previously mentioned, is found in the next memory location and is seen to be 13H. This value is added to the contents of register B1 (previously assumed to be pointing to the start of the depicted memory block) to produce the word address of the first operand; this, in conjunction with the offset field indicating that the operand starts in the second byte and the length field indicating an operand length of two establishes that the first operand is the 3132H shown in 20th and 21st (decimal) words of the depicted memory block. 3132H, interpreted as ASCII code, is the number 12. Thus, the first operand is the number 12.

The next word encountered, 8D81H, does not meet the criteria for being a Remote Descriptor specifier or an "AS345" specifier, and thus is the first word of the DD for the second operand.

It is seen that bit 8 of this word equals 1; this specifies that the second operand is in packed format.

Analyzing the other bits of 8D81H in the contexts of a DD for a packed operand, it is seen that:

Bits 0-1 contain $10_2=2$; this indicates that the operand starts at on offset of 2 half-bytes into the addressed word, or in the third half-byte of the addressed word.

Bit 2=0; this denotes that the operand is unsigned (type PU).

The length (bits 3-7) is $01101_2=13_{10}$; the operand is 13 digits long.

The m and n field of the Address Syllable are 0 and 1 respectively; as for the first operand, the address of the starting word of the operand is determined by adding the contents of base address register B1 to the displacement. The displacement is found in the next word, and is seen to be 5.

It is thus determined that the second operand is the 13-digit number 1234567890123; the operation of the instruction would be to add 12 to this number and store the sum, in PU (packed unsigned) data type in the locations originally occupied by the number 1234567890123.

It will now be shown how the CIP fetches the operands from memory (through the cache, "transparent" to the CIP) into the CIP's scratch pad memory right-justified and filled out with leading zeros, which is not the alignment they have in system memory.

Figure 2:
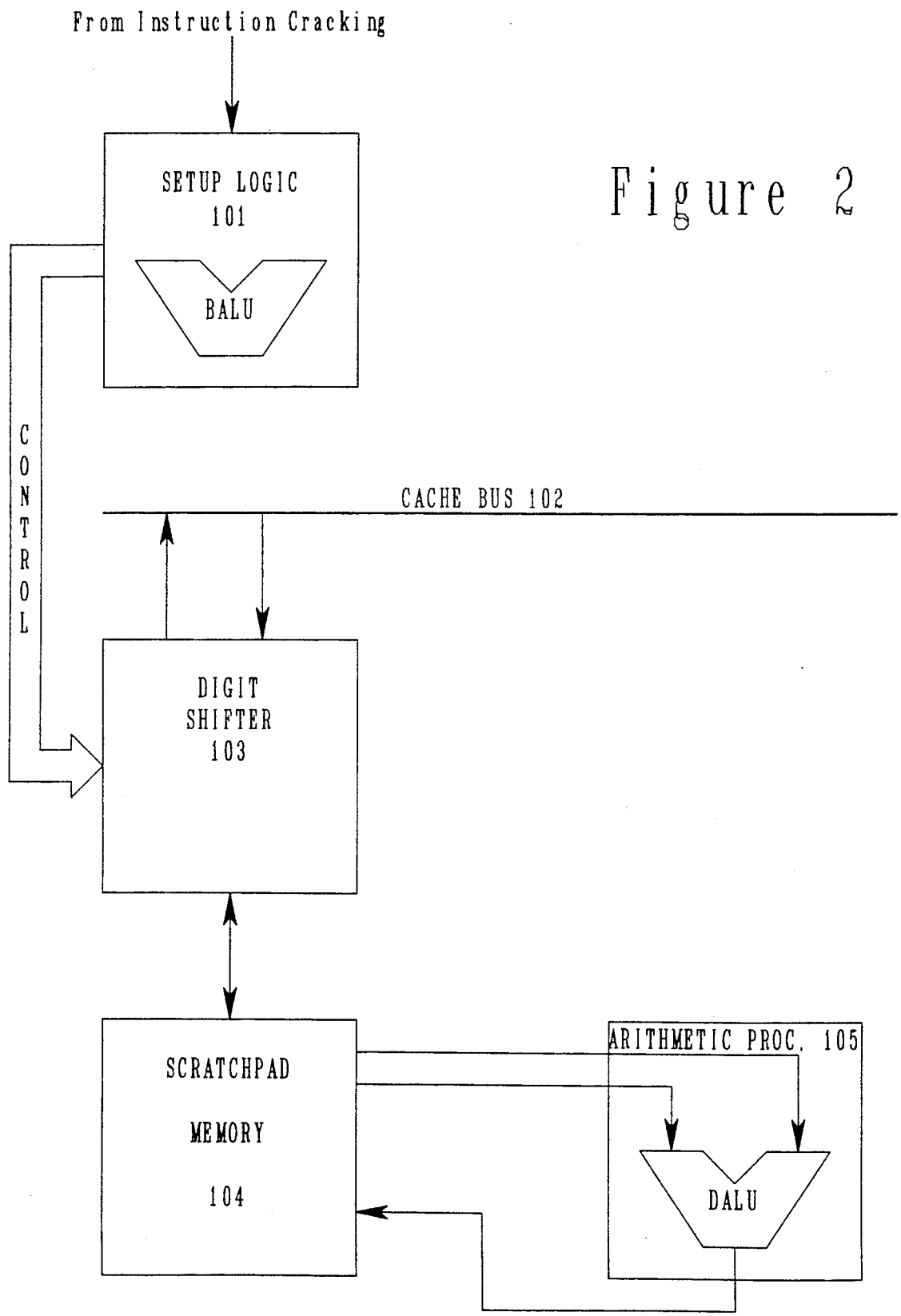
FIG. 2 is an overall block diagram of the Commercial Instruction Processor embodying the present invention.

Hardware and firmware are provided to accomplish this. A high-level block diagram of the CIP hardware is shown in FIG. 2. During the fetching and decoding of an instruction, the instruction cracking logic in the A-Unit and I-Unit send information (to be described in detail below) to Setup Logic 101, which includes a binary ALU (BALU) for performing its analyses. Subsequently the I-Unit and A-Unit cause the operands to appear (one at a time) on Cache Bus 102, where they are input to Digit Shifter 103. Under controls derived by Setup Logic 101, Digit Shifter 103 performs the requisite alignment and stores the aligned operands in Scratchpad Memory 104, whence they are operated upon to effect the instruction by Arithmetic Processor 105, which includes a decimal ALU (DALU) for performing the computations.

The CIP will receive the first operand (the number 12 in ASCII code (Zoned format)) from Cache Bus 102 and transform it for storage in the SPM in the form 00000012H-- i.e., the number 12 in BCD form right justified in a 32-bit (8-digit) double word. It will transform the second operand to the form 00012345H 67890123H-- i.e., the number 1234567890123 in BCD form right justified in two double words.

The fetching of the instruction and Data Descriptors from memory and the decoding of them are performed by the system's I-Unit; memory address calculations and the fetching of operands from memory are performed by the system's A-Unit. Typical operation of such units is known to those in the art and will be presupposed in the present discussion.

Figure 4:
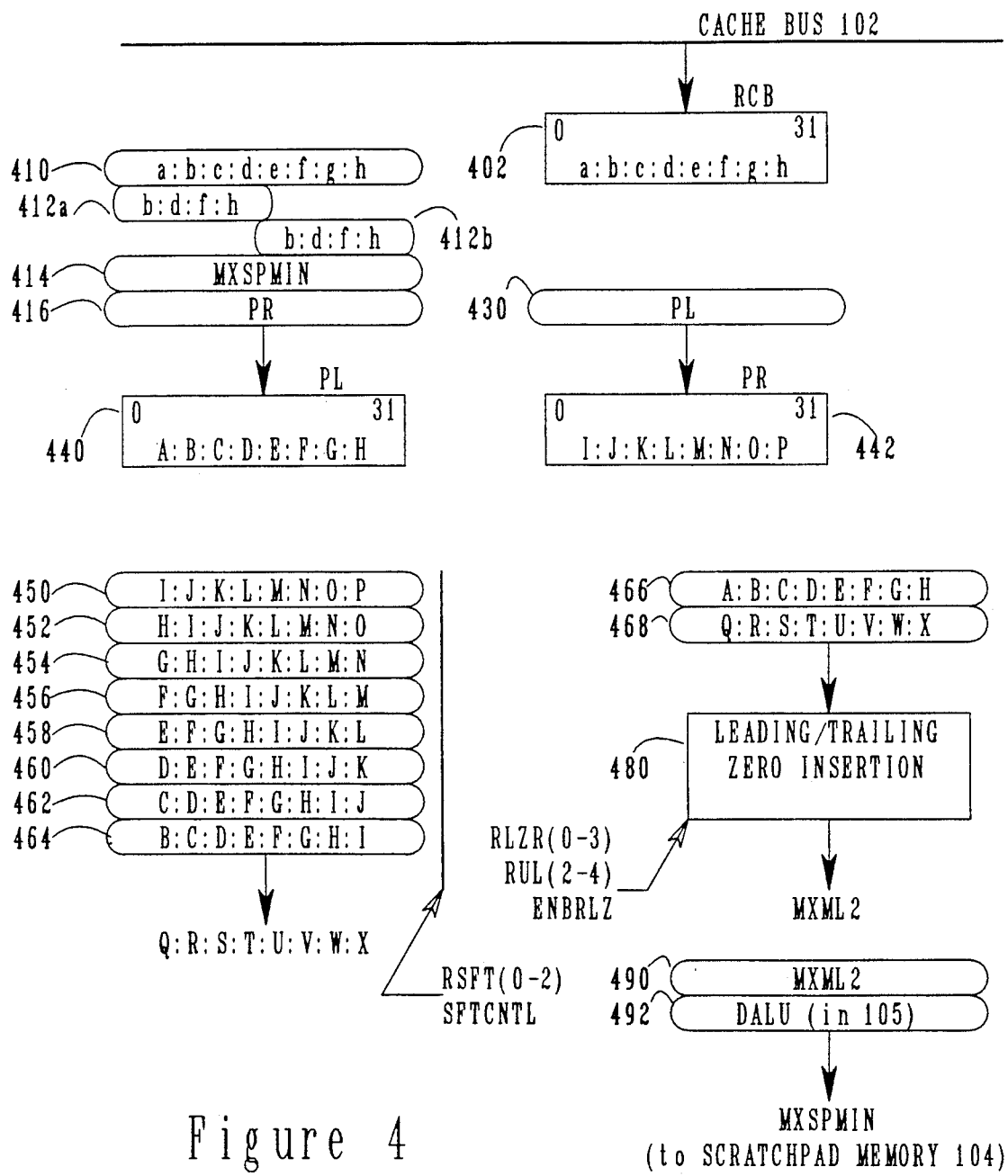
FIG. 4 depicts the digit shifter of the present invention.

Referring briefly to FIG. 4, at the time the double word containing the MSD of the first operand is being fetched, it appears on Cache Bus 102 and is input to register RCB 402, whence it may be inspected by the CIP. This could be useful for inspecting the sign of leading sign data; however, this is not germane to the present example, which assumes unsigned operands.

Figure 3:
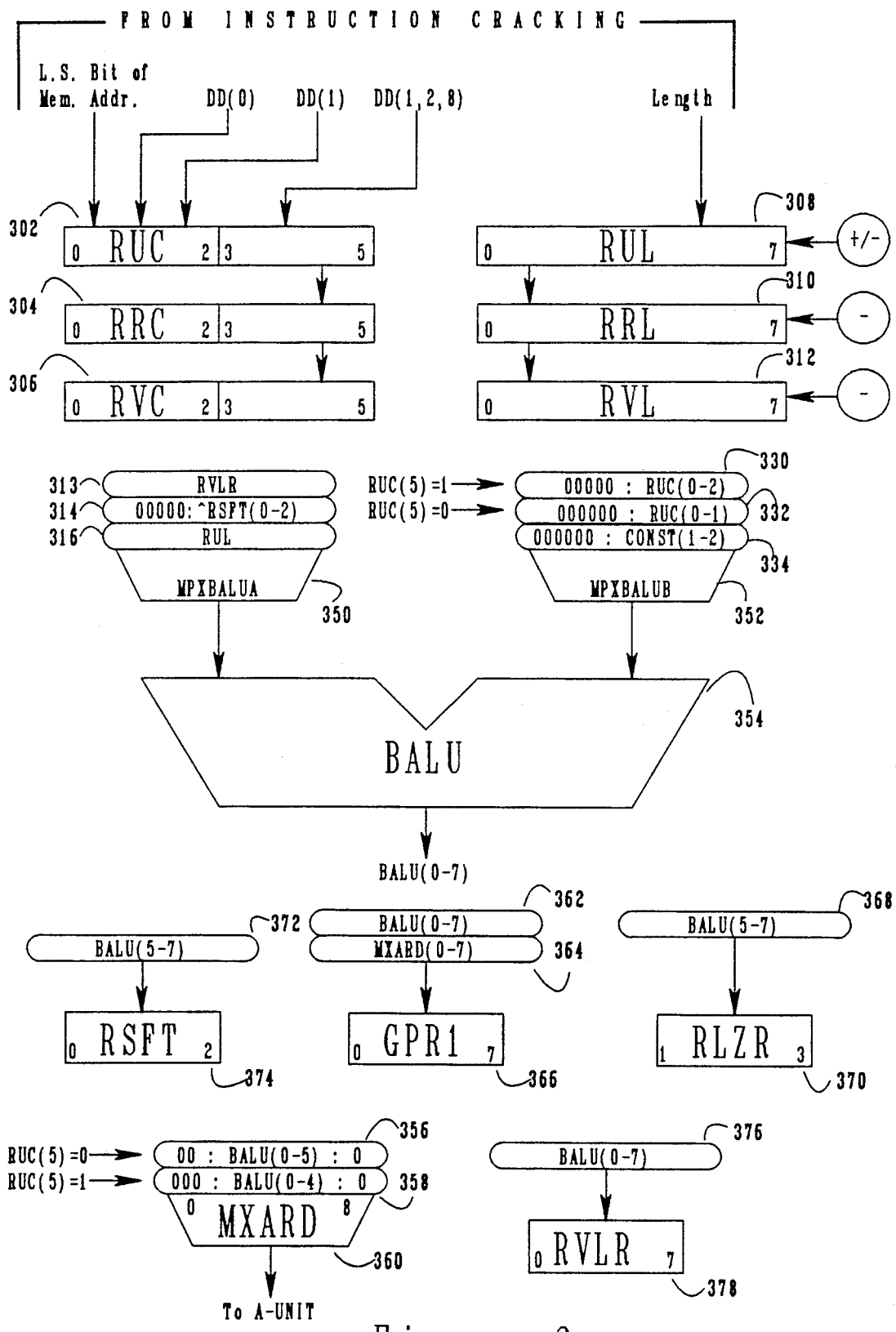
FIG. 3 depicts the setup logic of the present invention.

Referring to FIG. 3, during instruction decoding and fetching of the first operand, register RUC 302 receives certain address and DD information: Bit 0 receives the least significant bit of the memory address computed for the operand, which as described above is the address of the word containing the MSD. Therefore this bit is a word offset within a double word, since double-word boundaries coincide with even-numbered memory addresses which have a least significant bit of zero. RUC 302 bits 1 and 2 receive bits 0 and 1 from the DD. Because the first operand is a zoned operand, as will be discussed below in connection with switches 330 and 332 only bits 0 and 1 of RUC 302 will be used in calculation; correlation with the location of the operand as shown in FIG. 1 and with the makeup of a DD for zoned data will reveal that these two bits constitute a byte offset from a double-word boundary to the first byte of the operand. For the present example, the value in these two bits is 11B. This value may be referred to in the ensuing discussion as "Bo", denoting the "byte offset".

Bits 3-5 of RUC 302 receive bits 1, 2, and 8 respectively of the DD. Correlation with the DD makeup reveals that these three bits thus store the data type, with RUC bit 5 denoting whether the operand is packed or zoned.

Register RUL 308 receives the length from the DD. It is an 8-bit register, since string manipulation instructions (not discussed in connection with the present invention) may handle operands up to 256 characters long. The length for the commercial arithmetic instructions is limited to six bits; these will be right-justified in RUL 308.

As FIG. 3 indicates, RUL 308 has provision to be incremented or decremented; this takes place under control of the CIP's firmware. (The firmware will not be directly given herein; firmware to effectuate the functionality detailed herein is realizable by those in the art.) As noted above, the length for the first operand (in an 8-bit number) is 00000010B, which may be referred to in the ensuing discussion as "L".

Some of the calculations to be described require the quantity L-1. This is obtained by enabling switch 316 (the switches are composed of gates, the inputs being connoted by the legends inscribed in the switch symbols) which inputs the length from RUL 308 to BALU 354; firmware directs BALU 354 to decrement by one. The quantity L-1 thus appears on the lines BALU(0-7-); firmware enables switch 376, gating the quantity into RVLR 378 where it is held for subsequent use.

Next, firmware enables switches 313 and 332. The determination to enable switch 332, as opposed to 330, is predicated on RUC(5) being equal to 0, reflecting that DD(8) is 0, indicating that the first operand is a zoned operand. Firmware will also instruct BALU 354 to perform an add operation. The operation is thus to compute L-1+Bo, since RVLR contains L-1 and RUC(0-1) are seen to contain Bo, the byte offset from the present double-word boundary in system memory to the start of the present operand. Under the present example, this yields a sum of 00000100B on lines BALU(0-7).

While this bit configuration is present on lines BALU(0-7), firmware enables several other switches in order to capture the configuration in various forms: Switch 372 is enabled to gate 100B into RSFT 374. As a function of RUC(5), indicating that the present operand is a zoned one, switch 356 (rather than 358) is enabled producing 000000010B out of multiplexor MXARD 360; this number, having a value of two, is sent to the A-Unit to instruct it that the LSD of the operand is in the memory double word including the word being offset by that value (2) beyond the double word containing the MSD; responsive to this, the A-Unit will subsequently retrieve and forward that double word. Also at this time, firmware enables switch 364, gating 00000001B into GPR1 366.

Next, the contents of RSFT 374 are operated upon: firmware enables switches 314 and 334, and instructs BALU 354 to perform a logical AND. RSFT 374 having been loaded to 100B as described above, switch 314 passes the complement of that (complementing being denoted by the " ^ " symbol) which is 00000011B; firmware provides 11B for the value of CONST(1-2), so switch 334 is passing 00000011B. The resultant logical AND value output on lines BALU(0-7) is 00000011B; switch 372 is enabled to pass 011B into RSFT 374.

RLZR 370 is set up by enabling switches 316 and 368, and by instructing BALU 354 to simply pass the input MPXBALUA 350; this passes the three least significant bits from RUL 308, setting RLZR 370 to 010B.

It was mentioned that RUL 308 has provision to be incremented or decremented under firmware control; it is decremented at this time, changing its contents to 00000001B.

This completes the operation of Setup Logic 101 for the first operand; it will now be shown how the setups thus made control Digit Shifter 103 to achieve right-justified, zero-filled storage of the operands.

As noted above, the A-Unit will at some point send on Cache Bus 102 the double word containing the LSD of the operand. With brief reference to FIG. 1 it will be seen that this double word contains 32xxxxxxH. It is input to register RCB 402 on FIG. 4, in which the four-bit digit positions are denoted by lower case letters of the alphabet. Firmware, responsive to RUC(5) being equal to 0 denoting the current operand to be a zoned operand, enables one of switches 412a or 412b (as opposed to switch 410); this being the first double word retrieved, switch 412b is enabled, allowing 2xxxH to be gated into positions E, F, G, and H of register PL 440. It will be appreciated that this gating strips out the zone fields.

As was described above, register GPR1 366 (FIG. 3) contained 001B; this is interpreted as one less than the number of double words to fetc—i.e., since GPR1 contained a value equal to 1, 2 double words must be fetched. At this time, firmware decrements GPR1 to 000B and instructs the A-Unit to send the double word having the next lower address. Referring briefly to FIG. 1, that double word contains xxxxxx31H; it is input to register RCB 402.

Responsive to RUC(5) being equal to 0 and this being the second double word, firmware enables switch 412a, passing xxx1H into positions A, B, C, and D of PL 440, which thus contains xxx12xxxH; that is, it contains the desired operand, in packed format in the digit positions denoted D and E.

Firmware now enables switch 430, transferring xxx12xxxH into register PR 442. GPR1 having been decremented to zero indicates that fetching from memory is completed for this operand. The present desired operand, the number 12, is in digit positions L and M.

Switches 450 through 464 comprise the digit shifter of the CIP. It does not literally "shift" bits, but rather achieves the effect of digit shifting by passing any desired eight contiguous digits of the sixteen digits available in registers 440 and 442. Depending on whether switch 466 or switch 468 is enabled, either the shifter output (denoted as digit positions Q through X) or the unshifted contents of register 440 may be employed.

SFTCNTL ("Shift Control") is a firmware signal controlling whether left-shifting or right-shifting is to be performed. During fetching of operands, it will specify right-shifting. The value contained in RSFT 374 then specifies which of switches 450 through 464 is to be selected: 450 for a value of 000B, 452 for a value of 001B, and so on through 464 for a value of 0111B.

At this point in the present example, RSFT 374 having been loaded with a value of 011B as noted above, switch 456 is selected. Firmware also enables switch 468, gating xxxxxx12H into Leading/Trailing Zero Insertion Logic 480.

As described above, RUL 308 was left with contents of 00000001B. RUL(2-4) thus contain 000B; this is interpreted as being one greater than the number of double words that must be stored in Scratchpad Memory 104 for the present operand. It thus indicates in the present example that the present double word, although the first, is also the last that will be stored in Scratchpad Memory for the current operand; therefore, leading zero fill must be performed. RLZR 370 specifies the number of digit positions that must not be zero-filled; RLZR 370 was loaded with 010B as described above, which indicates that 010B or 2 (decimal) digits are not to be filled; therefore, six leading zeros are inserted, causing the output on lines MXML2 to be 00000012H, which is the first operand specified by the assumed instruction, right justified and zero-filled. Switch 490 is nabled to pass this double word on to Scratchpad Memory 104 for storage.

Referring again to FIG. 3, in preparation for processing of the second operand, firmware advances the contents of RUC 302 to RRC 304, and the contents of RUL 308 to RRL 310. Again for the second operand, the instruction cracking logic provides to bit 0 of RUC 302 the least significant bit of the memory address containing the MSD of the operand; reference to FIG. 1 reveals this bit to be a 1, since the MSD is in the second word of a double word. bits 0 and 1 of the DD are provided to bits 1 and 2 respectively of RUC 302; RUC(0-2) thus contain 110B.

DD bits 1, 2, and 8 are provided to RUC 302 bits (3-5); reference to FIG. 1 indicates that these bits will contain 001B.

The length from the DD (6 bits) is loaded right-justified into RUL 308, which will thus contain 00001101B. By the same means as for the first operand, the length decremented by one (L-1) is set into RVLR 378, which thus contains 00001100B.

Firmware then enables switches 330 (as opposed to 332, because RUC(5) is now equal to 1, indicating that the present operand is a packed operand) and 313, and instructs BALU 354 to perform an add. It is thus adding 00001100B (through switch 313) and 00000110B (through switch 330) and produces the sum 00010010B on lines BALU(0-7). By enabling switch 330 and passing RUC(0-2), it is thus a digit offset (Do, the number of digit (half-byte) positions from a double word boundary to the MSD) that is being passed, rather than a byte offset (Bo) as was the case for the first operand. The sum may therefore be characterized as L−1+Do.

Switch 358 (as opposed to 356, predicated on RUC(5) indicating the present operand to be a packed one) is enabled, gating 00000100B through multiplexor MXARD 360 and to the A-Unit; this number, having a value of 4, instructs the A-Unit that the double word containing the word that contains the LSD includes the word that is offset by that value (4) from the word containing the LSD. Also, switch 364 is enabled, gating 00000010B into GPR1 366. This will be interpreted as one less than the number of double words that must be fetched; reference to FIG. 1 shows that the present operand spans three double words in memory, so this value, being equal to two decimal, is the appropriate value.

Now RSFT 374 will be set to the value that will be required for subsequent control of Digit Shifter 103. Switches 316 and 330 are enabled, and BALU 354 is instructed to perform an ADD; this calculates the quantity L+Do, having a value in the present example 00010011B. Switch 372is enabled, gating the three rightmost bits, 011B, into RSFT 374. Then switch 314 is enabled, passing the complement of 011B or 100B in the rightmost bits, and BALU 354 is instructed to add one. The sum (101B) is passed by switch 372 into RSFT 374.

RLZR 370 is set by enabling switch 316, instructing BALU 354 to pass that input, and enabling switch 368. RLZR thus contains the three rightmost bits of the length, 101B.

Firmware then decrements RUL 308, so that its contents become 00001100B.

This completes the operation of Setup Logic 101 for the second operand.

Subsequently, the double word containing the LSD will be presented on Cache Bus 102 and received into RCB 402 (FIG. 4). FIG. 1 reveals this double word to contain 123xxxxxH. Switch 410 is enabled, gating this double word into PL 440. GPRI 366 is decremented from 010 to 001; still being positive, it indicates that the next lower-addressed double word is to be fetched.

That double word, which FIG. 1 shows to contain 34567890H appears on Cache Bus 102 and is received into RCB 402. Switch 430 gates 123xxxxxH from PL 440 into PR 442. Switch 410 gates 34567890H into PL 440.

Responsive to RSFT(0-2) 374 having been set to 101B, or a value of 5, during cracking, switch 460 is enabled at this time and will be seen to pass 67890123H, the 8 least significant digits of the operand in right-justified double-word form. Switch 468 is likewise enabled and passes this double word on to Leading/Trailing Zero Insertion Logic 480; RUL 308, bits 2-4, were set to a value of 001B or one decimal, indicating that two SPM words were to be stored (one more than the value in bits 2-4)—this being the first SPM word, no zero insertion is called for. The double word is passed on through switch 490 and stored in SPM 104.

NSPDW = number of SPM double words (held in RUL(2-4))

TABLE 2

| DATA TYPE | NDWF | RSFT (Bits 5-7) | RLZR (Bits 5-7) | NSPDW (Bits 2-4) |
|---|---|---|---|---|
| ZL | 00:((L-1 + Bo) (0-5)) | ⌃(L-1 + Bo) & 011 | L-1 | L-2 |
| ZT | 00:((L-1 + Bo) (0-5)) | ⌃(L-2 + Bo) & 011 | L-1 | L-2 |
| ZU | 00:((L-1 + Bo) (0-5)) | ⌃(L-1 + Bo) & 011 | L | L-1 |
| TP | 00:((L-1 + Bo) (0-5)) | ⌃(L-1 + Bo) & 011 | L | L-1 |
| PT | 000:((L-1 + Do) (0-4)) | ⌃(L-1 + Do) +1 | L | L-2 |
| PU | 000:((L-1 + Do) (0-4)) | ⌃(L + Do) +1 | L | L-1 |

GPR1 366 is decremented from 001B to 000B; still being positive, it indicates that another double word is to be fetched. That double word subsequently appears on Cache Bus 102 and is received into RCB 402. FIG. 1 reveals that double word to contain xxxxxx12H. GPRI indicates that this is the last double word to be fetched.

Switch 430 is now enabled, passing 34567890H from PL 440 to PR 442. Switch 410 is now enabled, passing the xxxxxx12H into PL 440. Again under control of RSFT 374 having a contents of 101B, Switch 460 is enabled, passing xxx12345H; switch 468 passes this into Logic 480. The count in RUL 308 bits(2-4) indicating that this is the last double word to be stored in SPM 104 for this operand, it must be determined whether zero-filling is to be performed. RLZR 370 was set up based on information available during cracking, as described above, to a value of 101B, or five decimal; this instructs Logic 480 that the five rightmost positions are not to be filled—that is, to insert 3 leading zeros, so that a double word containing 00012345H is passed to Switch 490 and on to SPM 104 for storage and subsequent computation by Arithmetic Processor 105.

It is thus seen that the two operands are stored in SPM 104, right justified on double word boundaries and filled out with leading zeros, during operand fetch. No further manipulation of them is required prior to performing the requested arithmetic operation upon them.

Having discussed the operation of the CIP during the fetching of two example operands of particular lengths and data types, we will now state the functions performed for all six of the data types accommodated by the arithmetic processor of the present invention. Those in the art will appreciate, in light of the foregoing, that setting up according to the rules given algorithmically in Table 2 will result in right-justified, zero-filled storage of operands for any of the data arrangements discussed. The following conventions are employed in Table 2:

⌃ denotes Complement
& denotes Logical AND
+ denotes numerical addition
− denotes numerical subtraction
L denotes the length of the operand (as specified in the DD, right-justified in an eight-bit word)
Bo = RUC(0-1) = starting byte offset of zoned data block
Do = RUC(0-2) = starting digit offset of packed data block
NDWF = number of double words to fetch from or store in system memory (held in GPR1))

Figure 5:
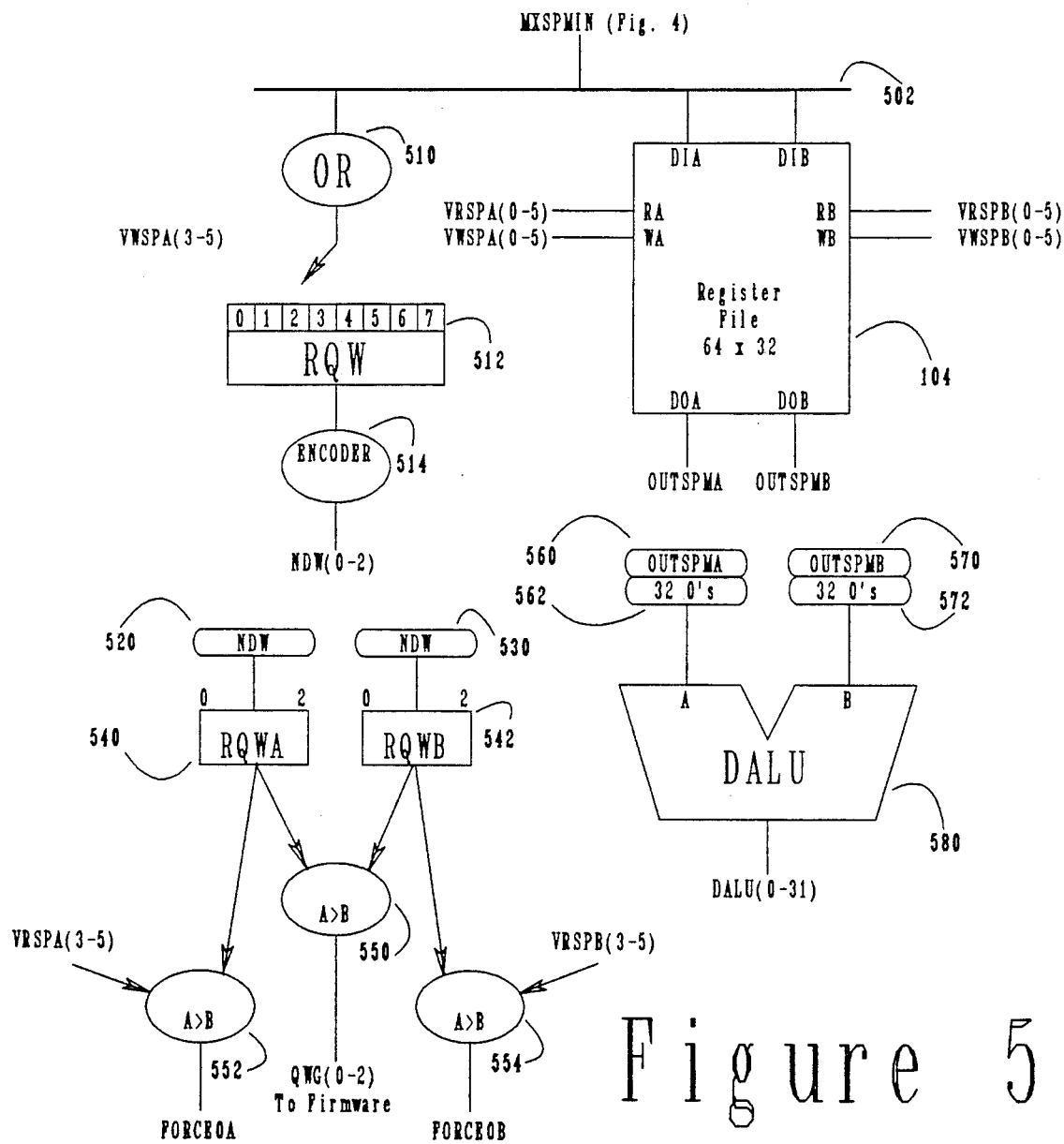
FIG. 5 depicts the scratchpad memory and portions of the arithmetic processor of the present invention.

Operation of the Invention:

Having shown how scratchpad memory 104 is loaded with operands, we now proceed to discuss the detection and skipping of calculation for double word positions of zero in both operands of an operation. FIG. 5 is a block diagram of scratchpad memory 104 and the pertinent portions of arithmetic processor 105.

A change to different example numbers will better illustrate this feature. It will now be supposed that the following two operands (for clarity, shown as demarked into double words) have been loaded into SPM 104 to be added:

|   |   |   |   |   |   |   |
|---|---|---|---|---|---|---|
|          | 00000000 | 00000000 | 00000000 | 00000000 | 00000000 | 99999999 |
| 00000000 | 00000000 | 00000000 | 00000000 | 00000000 | 99999999 | 99999999 |

These are specified as having lengths of 56 and 48 digits respectively. Operands must, in practice, be sized to accommodate the largest numbers that might be expected, but many typical calculations involve numbers quite a bit smaller than that, with the result that many operations are performed on operands having many leading zeros.

As discussed above, these operands would have been presented one double word at a time on lines MXSPMIN from FIG. 4. Referring to FIG. 5, they appear on bus 502 which connects to both input ports (DIA and DIB) of SPM 104. (SPM 104 oomprises a 64 looation by 32 bit reqister two-ported Register File). Under firmware control, either port may be used; both ports have access to the same locations. Six-bit addresses are required to select a desired one of the 64 locations: firmware has provision for generating such addresses on lines VRSPA in conjunction with the RA (Read A) input, VWSPA in conjunction with the WA (Write A) input, and comparable addresses for the B port.

64 locations of 32 bits (8 digits each) is sufficient to store 512 digits; this capacity is provided because the divide instruction must have room not only for its operands but for computation of quotients, remainders, and results. Numeric operands, as has been mentioned, may be up to 63 digits (8 double words) long. The first (least significant) double word of an operand is stored in a SPM location having an address whose three least significant bits are 000B; subsequent double words of an operand are stored at sequentially incremented addresses. It will be assumed in the present example that the first operand is stored with its least significant double word at address 000000B, and the second operand is stored with its least significant double word at address 001000B. Thus, after storage of the operands the pertinent portion of SPM 104 will appear thusly:

| LOCATION (Binary) | CONTENTS (Hex) |
|---|---|
| 000000 | 99999999 |
| 000001 | 00000000 |
| 000010 | 00000000 |
| 000011 | 00000000 |
| 000100 | 00000000 |
| 000101 | 00000000 |
| ⋮ | ⋮ |
| 001000 | 99999999 |
| 001001 | 99999999 |
| 001010 | 00000000 |
| 001011 | 00000000 |
| 001100 | 00000000 |
| 001101 | 00000000 |
| 001110 | 00000000 |
| ⋮ | ⋮ |

The operands are stored through the DIA port, addressed by VWSPA(0–5). Prior to storing an operand, firmware resets RQW 512. While the first (least significant) double word of the first operand is on bus 502 for input to the DIA port of SPM 104, it is also input to OR 510, which produces a "1" output if any of the 32 bits on bus 502 are equal to 1; the output of OR 510 is input to a bit position of RQW 512 corresponding to the three low order bits of VWSPA, which is being used to address SPM 104 for a operand storage. Under the present example, during storage of the first operand, bit 0 of RQW 512 is set, reflecting the fact that only the first double word of that operand contains non-zero digits.

Encoder 514 encodes the eight bits of RQW 512 into a three bit number. The operation of encoder 14 is given in Table 3, in which the convention is employed that if a bit is represented as "x" its contents do not matter.

TABLE 3

| Bits set in RQW 512<br>0 1 2 3 4 5 6 7 | Output of Encoder 514 |
|---|---|
| 0 0 0 0 0 0 0 0 | 000 |
| 1 0 0 0 0 0 0 0 | 000 |
| x 1 0 0 0 0 0 0 | 001 |
| x x 1 0 0 0 0 0 | 010 |
| x x x 1 0 0 0 0 | 011 |
| x x x x 1 0 0 0 | 100 |
| x x x x x 1 0 0 | 101 |
| x x x x x x 1 0 | 110 |
| x x x x x x x 1 | 111 |

In other words, the output of encoder 514 yields one less than the number of SPM double words that contain significant digits, except that it yields 000 if none of the double words contain significant digits. (Leading zeros are not significant digits, but embedded zeros are significant digits.)

For the first operand, RQW will end up with only bit 0 set, and encoder 514 will output 000B, indicating that at most only the one least significant word of the first operand is non-zero. When storage of the first operand is complete, firmware enables switch 520, gating the value 000B into RQWA 540.

Prior to storing the second operand, RQW 512 is again reset. The function of OR 510 in conjunction with the three low order bits of VWSPA will be seen to result in bits 0 and 1 of RQW 512 being set after storing the second operand, reflecting that its first and second double words are non-zero. Encoder 514 will therefore yield the value 001B. Firmware enables switch 530, gating 001B from encoder 514 into RQWB 542.

Comparator 550 outputs the higher of RQWA or RQWB contents on lines QWG; under the present example, QWG will be equal to 001B, reflecting that the highest number of non-zero words in either of the operands is one more than that, or two.

Comparator 552's output is TRUE if VRSPA(3–5) is greater than the contents of RQWA 540; similarly, comparator 554 s output is TRUE if VRSPB(3–5) is greater than the contents of RQWB 542. Since VRSPA and VRSPB are addressing SPM 104 to retrieve operand double words, these functions are seen to determine whether double words containing leading zeros are being addressed.

Now the actual addition of the two operands will commence.

Under firmware control, based on bits 3–5 of VRSPA and VRSPB not having exceeded the value in QWG, the first operand is accessed from SPM 104 through the A Port, addressed a double word at a time by VRSPA and appearing on the DOA output; simultaneously, the second output is accessed through the B Port, addressed by VRSPB and appearing on the DOB port. VRSPA is initially set by firmware in this example to 000000B-, and VRSPB to 001000B, the starting (least significant) addresses of the two operands.

For the first double word position, the conditions are not met for either of comparators 552 and 554 to produce a TRUE output. For the first double word position, 99999999H appears at the DOA output of SPM 104, and is gated through switch 560 to the A input of DALU 580; 99999999H appears at the DOB output and is gated through switch 570 to the B input of DALU 580. DALU 580 is instructed by firmware to do a decimal add; the sum, 99999998H, appears at the output lines and is gated through switch 492 (FIG. 4) for storage back in SPM 104. A carry of 1 is retained.

VRSPA and VRSPB are incremented for the second double word position, so that bits 3–5 of both of them go 001B. It will be seen on FIG. 5 that comparator 552 now produces a TRUE output, while comparator 554 does not, since Since RQWA 540 contains 000B while RQWB 542 contains 001B. Responsive to this, Switch 570, rather than 572, is enabled, so that the second double word of the second operand is presented to DALU 580 for addition; however, switch 562 rather than 560 is enabled—forced zeros rather than the data read from SPM 104 are presented to DALU 580. DALU 580 is thus adding 00000000, 99999999, and the aforementioned carry of 1. The sum of 00000000 is stored back in SPM 104, and a carry of 1 is again retained.

The capability to force zeros does not impart any advantages with the operands of the present example, but would be important with an operand pair where one operand has fewer double word positions than the number of significant double word positions of the other operand. While performing addition for double word positions that do not exist in one of the operands, attempts to access scratchpad memory for that operand would access locations that had not stored by the present instruction, and which would thus contain unspecified or unpredictable contents; instead, zeros are forced in for them. The prior art resolution would be to write zeros into the subject memory locations prior to operand storage, with a commensurate loss of time.

Returning to the present example, under the prior art the machinations of addition would continue for the number of words in the destination (second) operand, as specified by bits 2–4 of RUL 308, as described further above. Under the present invention, addition continues only until one more double word position than there are positions having non-zero double words, as specified by alines QWG(0–2) output from comparator 550. In the present example, although neither of the operands contains non-zeros in its third double word position, the machinations of addition must be gone through in order for the aforementioned retained carry to be reflected in the result. Firmware, in response to the value in QWG, permits addition to take place for the third double word position. Because of the retained carry from the second double word position, the sum of 00000001H is produced for the third double word of the result.

VRSPA and VRSPB are incremented for the third double word position; VRSPA thus goes to 000010B and VRSPB goes to 001010B. Since RQWA 540 contains 000B, and VRSPA(3–5) now contain 010B, the conditions are again met to produce the signal FORCE0A from comparator 552; rather than enable switch 560 gating the SPM 104 output into DALU 580, zeros are forced. The conditions are now likewise met to produce FORCE0B from comparator 554, VRSPB(3–5) containing 010B which is greater than the 001B held in RQWB 542; zeros are forced into the B input of DALU 580 as well.

Under the prior art, bits 2–4 of RUL 308 would indicate that there are yet additional double words to be processed; under the present invention, however, QWG, which was set up during operand fetching and storage as described above, signals the firmware to terminate addition at this point. Going through the motions of addition for the remaining double word positions could not alter the result and would thus be a waste of time.

The invention may be embodied in other specific forms without departing from the spirit thereof. The invention is intended to be embraced by the appended claims rather than limited to the foregoing description of a particular embodiment.

What is claimed is:

1. In a digital computer having an ALU for performing arithmetic computation upon pairs of operands, a memory means connected to the ALU and organized as addressable words for storing operands, where an operand occupies a number of contiguous words, and fetching means for presenting the operands for storage in the memory means a word at a time, least significant word first,
apparatus for bypassing computation of those word positions of operands which contain no significant digits in either operand of the pair, comprising:
OR gate means connected to the fetching means for determining whether an operand word contains non-zero digits;
first register means operatively connected to the OR gate means for storing the number of words containing significant digits in a first operand of the pair;
second register means operatively connected to the OR gate means for storing the number of words containing significant digits in the second operand of the pair;
comparator means for determining an index number equal to the greater of the first register means contents and the second register means contents; and
means for terminating computation after one more than said index number of word positions have been computed.

2. In the digital computer of claim 1, wherein further each operand has a maximum size of eight words, each operand is stored, LSD first, in a memory location whose address has its three least significant bits equal to 000, and successive words of the operand are stored at successively higher-addressed locations;
the operative connection of the first and second register means to the OR gate means comprising:
third register means comprising eight bit positions;
switch means for storing the output of the OR gate means in a certain bit position of the third register means corresponding to the value of the three least significant bits of the memory address at which the fetching means is storing; and
encoder means for producing and storing in the first and second register means, respectively according to whether the first or second operand has been fetched, a three-bit number representing the highest-order bit set in the third register means.

3. In a digital computer having an ALU for performing arithmetic computation upon pairs of operands, a memory means connected to the ALU and organized as addressable words for storing operands, where an operand occupies a number of contiguous words, and fetching means for presenting the operands for storage in the memory means a word at a time, least significant word first,
a apparatus for bypassing computation of those word positions of operands which contain no significant digits in either operand of the pair, comprising:
OR gate means connected to the fetching means for determining whether an operand word contains non-zero digits;
first register means operatively connected to the OR gate means for storing the number of words containing significant digits in a first operand of the pair;
second register means operatively connected to the OR gate means for storing the number of words containing significant digits in the second operand of the pair; and
first and second forcing means responsive to the first and second register means respectively for forcing the first and second operand word positions, respectively, to zero in word positions in which the first or second operand, respectively, does not contain significant digits.

4. In the digital computer of claim 3, wherein further each operand has a maximum size of eight words, each operand is stored, LSD first, in a memory location whose address has its three least significant bits equal to 000, and successive words of the operand are stored at successively higher-addressed locations; the operative connection of the first and second register means to the OR gate means comprising:
a third register means comprising eight bit positions;
switch means for storing the output of the OR gate means in a certain bit position of the third register means corresponding to the value of the three least significant bits of the memory address at which the fetching means is storing; and
encoder means for producing and storing in the first and second register means, respectively according to whether the first or second operand has been fetched, a three-bit number representing the highest-order bit set in the third register means.

5. In a digital computer having an ALU for performing arithmetic computation upon pairs of operands, a memory means connected to the ALU and organized as addressable words for storing operands, where an operand occupies a number of contiguous words, and fetching means for presenting the operands for storage in the memory means a word at a time, least significant word first, apparatus for bypassing computation of those word positions of operands which contain no significant digits in either operand of the pair, comprising:

OR gate means connected to the fetching means for determining whether an operand word contains non-zero digits;

first register means operatively connected to the OR gate means for storing the number of words containing significant digits in a first operand of the pair;

second register means operatively connected to the OR gate means for storing the number of words containing significant digits in the second operand of the pair;

comparator means for determining an index number equal to the greater of the first register means contents and the second register means contents; and means for terminating computation after one more than said index number of word positions have been computed; and first and second forcing means responsive to the first and second register means respectively for forcing the first and second operand word positions, respectively, to zero in word positions in which the first or second operand, respectively, does not contain significant digits.

6. In the digital computer of claim 5, wherein further each operz and has a maximum size of eight words, each operand is stored, LSD first, in a memory location whose address has its three least significant bits equal to 000, and successive words of the operand are stored at successively higher-addressed locations; the operative connection of the first and second register means to the OR gate means comprising:

third register means comprising eight bit positions;

switch means for storing the output of the OR gate means in a certain bit position of the third register means corresponding to the value of the three least significant bits of the memory address at which the fetching means is storing; and encoder means for producing and storing in the first and second register means, respectively according to whether the first or second operand has been fetched, a three-bit number representing the highest-order bit set in the third register means.

* * * * *